United States Patent
Rai et al.

(10) Patent No.: US 8,681,802 B2
(45) Date of Patent: Mar. 25, 2014

(54) PROXY FHRP FOR ANYCAST ROUTING SERVICE

(75) Inventors: Smita Rai, Mountain View, CA (US); Chandan Mishra, Campbell, CA (US); Gayatri Ramachandran, Sunnyvale, CA (US); Sanjay Sane, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 228 days.

(21) Appl. No.: 13/209,839

(22) Filed: Aug. 15, 2011

(65) Prior Publication Data
US 2013/0044757 A1    Feb. 21, 2013

(51) Int. Cl.
*H04L 12/28* (2006.01)
(52) U.S. Cl.
USPC ............ 370/395.53; 370/235; 370/400
(58) Field of Classification Search
USPC .......... 370/230, 230.1, 231, 235, 353–356, 370/389, 392, 395.53, 395.6, 400–401, 370/465–466
See application file for complete search history.

(56) References Cited

U.S. PATENT DOCUMENTS

| | | | | |
|---|---|---|---|---|
| 6,002,689 A | * | 12/1999 | Christie et al. | 370/401 |
| 6,934,292 B1 | * | 8/2005 | Ammitzboell | 370/400 |
| 7,203,187 B1 | * | 4/2007 | Richardson et al. | 370/352 |
| 7,346,025 B2 | * | 3/2008 | Bryson | 370/328 |
| 7,512,226 B1 | * | 3/2009 | Yoakum et al. | 379/355.01 |
| 2004/0114570 A1 | * | 6/2004 | Vikberg et al. | 370/351 |
| 2006/0045068 A1 | * | 3/2006 | Wu et al. | 370/352 |
| 2007/0291733 A1 | * | 12/2007 | Doran et al. | 370/352 |
| 2012/0027017 A1 | * | 2/2012 | Rai et al. | 370/392 |
| 2012/0131216 A1 | * | 5/2012 | Jain et al. | 709/230 |
| 2012/0300782 A1 | * | 11/2012 | Farinacci et al. | 370/392 |
| 2013/0094357 A1 | * | 4/2013 | Sankar et al. | 370/230 |

OTHER PUBLICATIONS

Author Unknown, "Load Sharing with HSRP," Aug. 10, 2005, http://www.cisco.com/en/US/tech/tk648/tk362/technologies_configuration_example09186a0080094e90.shtml, 3 pages.

* cited by examiner

*Primary Examiner* — Kevin Mew
(74) *Attorney, Agent, or Firm* — Merchant & Gould P.C.

(57) ABSTRACT

Embodiments herein achieve proxy FHRP for anycast routing services through the coordination of L2MP edge switches to allow load balancing for the use of routing services. Such embodiments may avoid duplicity and coordinate control planes between the edge switches to present a proxy interface to the rest of the network for the routing services. As such, multipathing and load-balancing for efficient use of crucial services may be provided for client nodes inside the network.

14 Claims, 7 Drawing Sheets

PROXY FHRP FOR ANYCAST ROUTING SERVICE

TECHNICAL FIELD

The present disclosure relates generally to the coordination between Layer-2 Multipathing ("L2MP") edge switches to allow load balancing for routing services.

BACKGROUND

In an Layer-2 ("L2") network, multiple switches may have connection to a service, for example routers running Hot Standby Router Protocol ("HSRP"). In prior art systems, one HSRP device out of the plurality of routers may act as an active router. The active router may reply to Address Resolution Protocol messages ("ARPs") for a subnet's default gateway. This will allow the active router to attract and forward traffic from the L2 network, which may need Layer-3 ("L3") routing.

It may be desirable to provide an anycast-type of service for this L3 routing, so that traffic may be load-balanced across all the L3 access points so that all of the routers (assuming tables are consistent) can forward traffic to the desired location.

BRIEF DESCRIPTION OF THE DRAWINGS

Many aspects of the disclosure can be better understood with reference to the following drawings. The components in the drawings are not necessarily to scale. Emphasis is instead placed upon clearly illustrating the principles of the present disclosure. Moreover, in the drawings, like references numerals designate corresponding parts through the several figures.

DETAILED DESCRIPTION OF EXAMPLE EMBODIMENTS

In various embodiments, a method may be provided comprising: emulating a switch connected to a cloud network, wherein the emulated switch is accessible by a plurality of cloud network junction devices. Next, HSRP hello messages may be filtered at the plurality of cloud network junction devices. A primary HSRP proxy may then be elected from the plurality of cloud network junction devices and traffic may be directed from a first network device through the primary HSRP proxy to the emulated switch.

Embodiments of the present invention for Proxy FHRP for anycast routing services may be implemented in hardware, software, firmware, or a combination thereof (collectively or individually also referred to herein as logic). To the extent certain embodiments, or portions thereof, are implemented in software or firmware, executable instructions or code for performing one or more tasks of Proxy FHRP for anycast routing services are stored in memory or any other suitable computer readable medium and executed by a suitable instruction execution system. In the context of this document, a computer readable medium is an electronic, magnetic, optical, or other physical device or means that can contain or store a computer program for use by or in connection with a computer related system or method.

To the extent embodiments, or portions thereof, are implemented in hardware, the present invention may be implemented with any or a combination of the following technologies: a discrete logic circuit(s) having logic gates for implementing logic functions upon data signals, an application specific integrated circuit (ASIC) having appropriate combinational logic gates, programmable hardware such as a programmable gate array(s) (PGA), a field programmable gate array (FPGA), etc.

Figure 1:
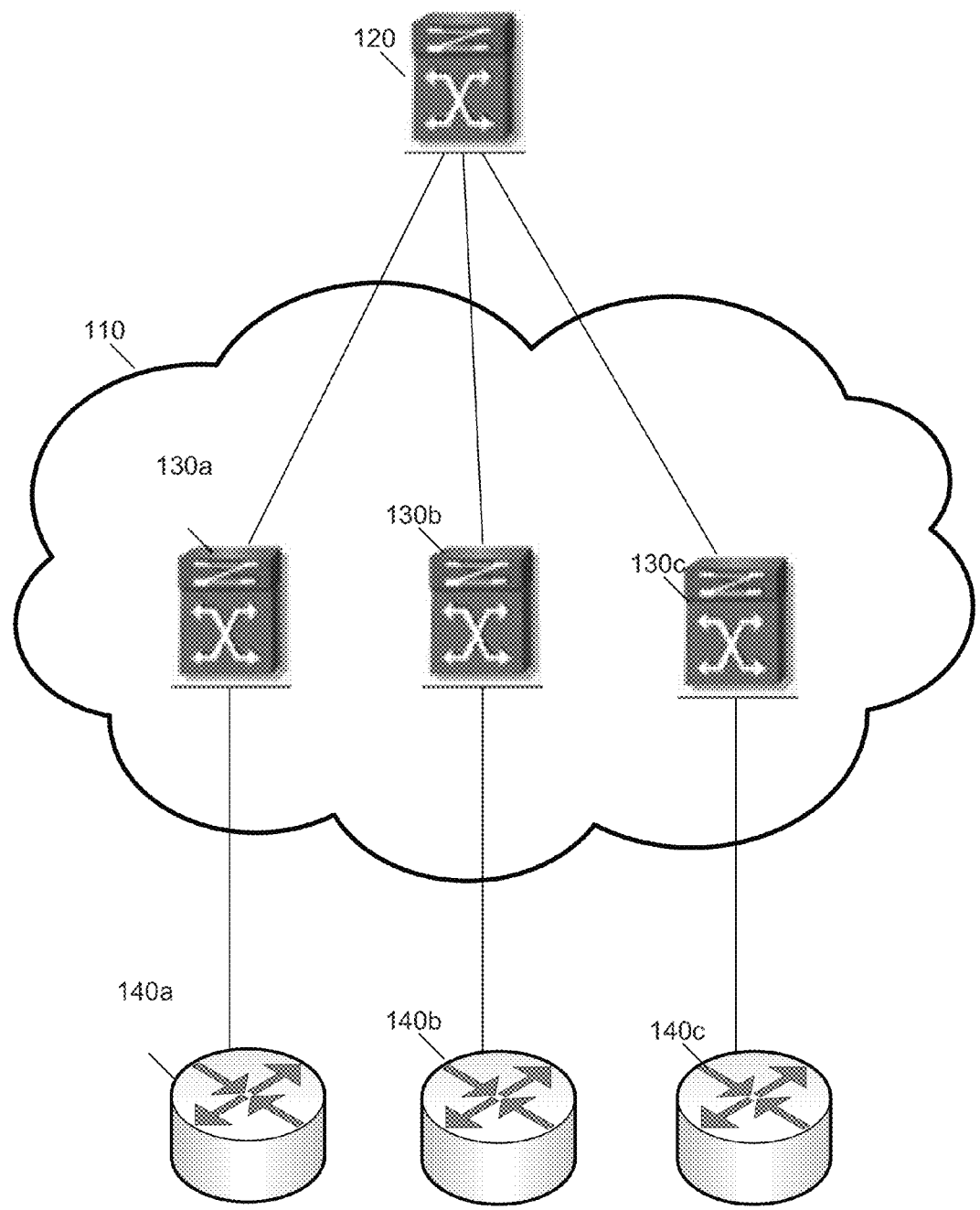
FIG. 1 illustrates a typical HSRP operating environment.

FIG. 1 illustrates a typical HSRP operating environment. In an L2 network, multiple switches 130a, 130b, 130c, may be connected to routers 140a, 140b, 140c, respectively. Routers 140a, 140b, 140c, may all be operating HSRP. In prior systems only one of routers 140a, 140b, 140c, may be acting as the active router. For this example, assume that router 140c has been designated the active router. Active router 140c may operate to reply to ARPs for the subnet's default gateway. As such, active router 140c may attract and forward traffic from the L2 network 110, which may require L3 routing.

In this scenario, active router 140c handles all of the L3 forwarding. Routers 140a and 140b may act as standby routers ready to take over if active router 140c fails. One proposed solution to achieve a level of load balancing is to configure routers 140a, 140b, 140c to each be configured with multiple HSRP groups. For example, router 140a may be configured to be active for one group, and router 140b may be configured to handle a second group. As such, half of the nodes in the network may use the virtual IP address of the first group as the gateway and the rest of the nodes may use the virtual IP address of the second group. This may not lead to a desirable balancing scenario.

Alternatively, with a virtual port channel ("vPC"), if HSRP is co-existing on the vPC switches, and the L2/L3 boundary is on the vPC switches, an active-active HSRP model may be employed for the switches 130a, 130b, 130c participating in the vPC complex. In this case, if L3 traffic due to vPC port-channel load balancing lands on a standby switch, the standby router may still route the traffic, instead of re-directing L3 traffic to the active router.

Embodiments described in the present disclosure operate in environments with the following network constraints: 1) HSRP routers 140a, 140b, 140c are no co-located within the L2MP cloud 110; 2) a single router is not dually connected to the L2MP edge nodes (instead, there may be multiple routers 140a, 140b, 140c, that maintain consistent routing information, and the routers 140a, 140b, 140c may be connected to L2MP edge switches 130a, 130b, 130c); and 3) the control plane protocols of routers 140a, 140b, 140c (e.g., HSRP, etc) remain unchanged.

Figure 2:
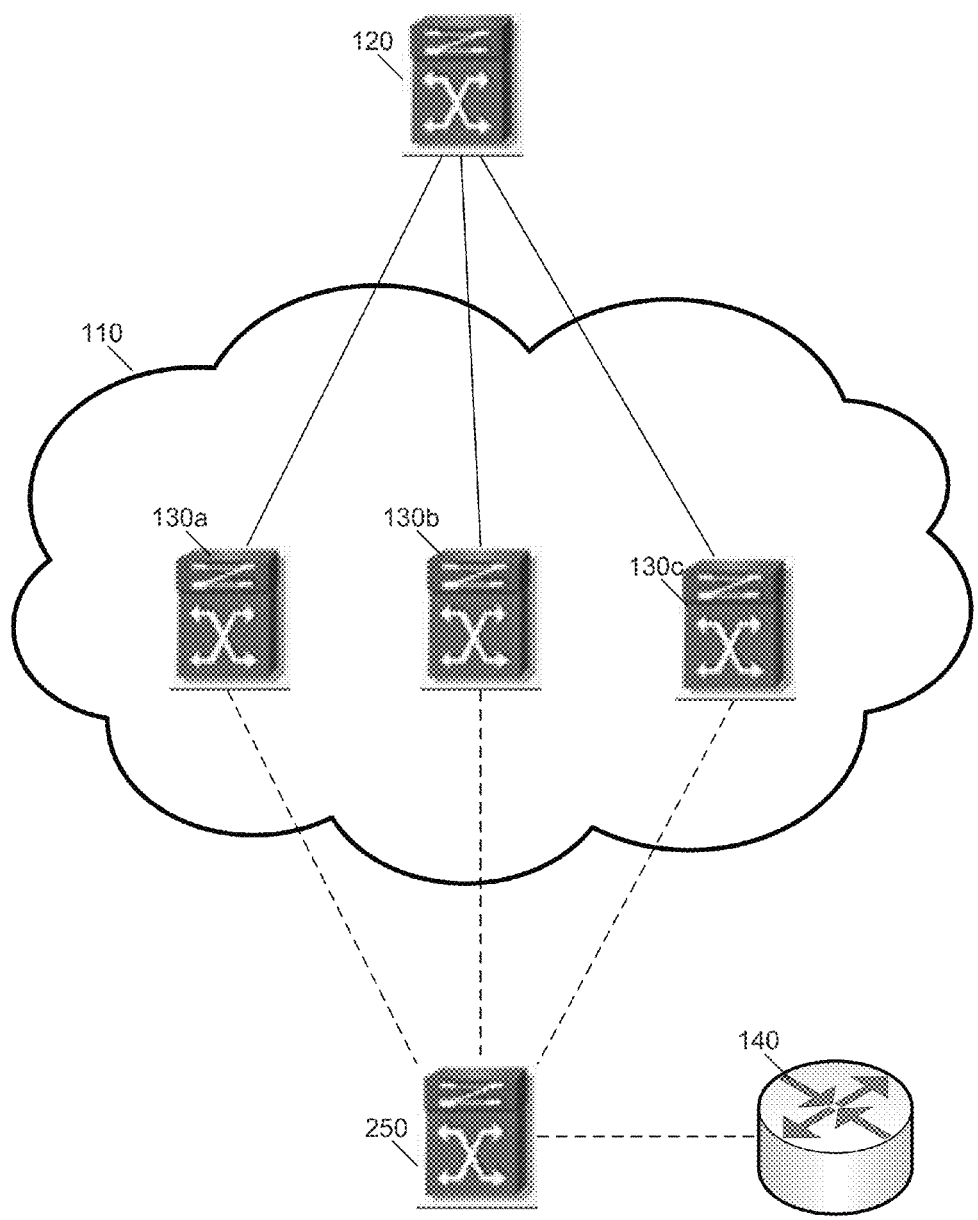
FIG. 2 illustrates an operating environment for embodiments described in the present disclosure.

FIG. 2 illustrates an operating environment for embodiments described in the present disclosure. To achieve anycast L3 service in L2MP cloud 110, where switches 130a, 130b, 130c may receive and forward L3 traffic to respective routers 140 connected to them, the presence of switch 250 may be emulated. Emulated switch 250 may be connected to cloud 110 and may be reachable by each of switches 130a, 130b, 130c.

Switches 130a, 130b, 130c may participate through IS-IS to advertise the presence of emulated switch 250. As such, node 120 may have Equal Cost Multi-Path routing devices ("ECMPs") between itself and switches 130a, 130b, 130c, and emulated switch 250 may remain reachable through any of switches 130a, 130b, 130c. Emulated switch 250 may be advertised as being connected to router 140. So to reach router 140, node 120 may go through any of switches 130a, 130b, 130c in the presence of ECMPs.

In some embodiments of the present disclosure, it may be assumed that all routers 140 connected to switches 130a, 130b, 130c will forward L3 traffic received from cloud 110. As such, all routers 140 may be operating as HSRP active. Achieving this behavior is described in further detail below.

Switches 130a, 130b, 130c may need to stop HSRP control packets received from routers 140 and not forward them into cloud 110. Access control lists ("ACLs") may be operating to intercept and punt to a supervisor HSRP packets received on the router facing interface. This may be accomplished through the standard IP multicast groups as used by HSRP. This packet filtering results in the HSRP protocol on each of the routers 140 will find no other active routers and may declare itself active and ready to forward L3 traffic.

Switches 130a, 130b, 130c may also program their MAC tables with the HSRP virtual MAC address pointing to the router facing interfaces. As such, switches 130a, 130b, 130c will not allow the HSRP virtual MAC address to be a dynamically learnt entry. This results in the appropriate forwarding of packets destined to the HSRP vMAC.

Subsequently, switches 130a, 130b, 130c may terminate and consumer HSRP packets, and subsequently exchange between themselves HSRP information. The information may be exchanged periodically through IS-IS messaging or a dedicated channel such as CFS, or any other appropriate method. The HSRP related information may include information in a condensed form, such as (virtual IP, virtual MAC) address information. This HSRP information may allow switches 130a, 130b, 130c to decide to individually advertise reachability to emulated switch 250, if each is connected to the same group of HSRP routers. If a mismatch is detected, switches 130a, 130b, 130c may stop advertising reachability to emulated switch 250.

Switches 130a, 130b, 130c may thus form a proxy-HSRP complex. Switches 130a, 130b, 130c may then elect one of themselves to reply to received ARPs to hosts in cloud 110. The HSRP virtual MAC address gleaned from the terminated HRSP packets and the virtual IP address. This election may follow HSRP semantics, where the election is based on the switch connected to the router with the highest priority. The elected switch may then declare itself active to respond to ARP messages. However, once another switch in the proxy-HSRP advertises that it has a connection to a router with a higher priority, that switch may become the active switch. A node 120 may also stop advertising reachability to emulated switch 250 if it stops receiving HSRP packets on its router facing ports.

Figure 3:
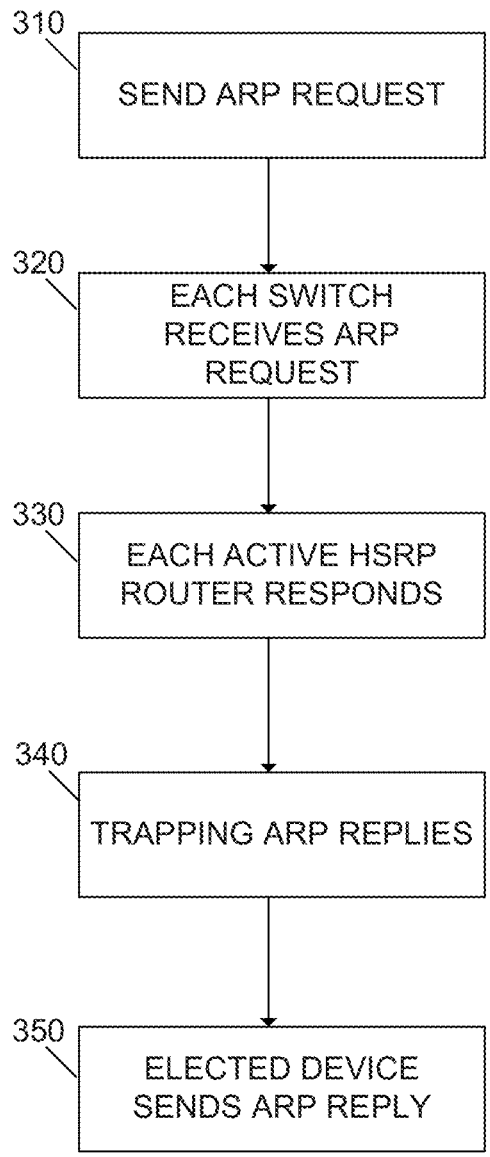
FIG. 3 illustrates a flow chart description of embodiments of the present disclosure.

FIG. 3 illustrates a flow chart description of embodiments of the present disclosure for a unicast packet flow from node 120 to an L3 network. The method may start at step 310 where hosts connected to node 120 may send an ARP request for their associated gateway. Subsequently, at step 320, the ARP request may be received at each of switches 130a, 130b, 130c in the case of a flooded ARP request. Each of switches 130a, 130b, 130c may forward the ARP request out of their router facing interfaces.

Once the ARP requests have been forwarded, the method may proceed to step 330. At step 330, each of the active HSRP routers 140 may respond to the ARP request. The responses may include virtual MAC binding to the gateway IP address. The method may proceed to step 340, where switches 130a, 130b, 130c of the proxy-HSRP complex may program ARP ACLs on each of the router facing ports. As such, the ARP replies may be trapped with the source MAC as the virtual MAC.

The method may then proceed to step 350. At step 350, one of the switches 130a, 130b, 130c as chosen through the election process described above may send an ARP reply comprising the virtual MAC and the identification of emulated switch 250. The identification may include the virtual IP address for which the router 140 is connected to. The unicast L3 traffic may be directed to emulated switch 250. Subsequently, the unicast traffic may reach either of the switches 130a, 130b, 130c such that the selected switch will forward the unicast traffic along to its router-facing interfaces that have learned the virtual MAC. Is some embodiments of the present disclosure, ARP ACLs trapping packets destined to a gateway IP may be programmed on cloud-facing ports to achieve step 350.

Return traffic may enter cloud 110, through any of switches 130a, 130b, 130c, based on routing table information. The L3 unicast return flow may carry the router MAC of router 140 which routed the information as its inner switch address and may subsequently tagged with the identification information of the one of switches 130a, 130b, 130c (based on which it lands on).

For normal multicast packets traversing between port 120 to the L3 network, the multicast packets may be allowed to flow out of the router facing ports 120, under the assumption that one of the routers 140 will act as the designated forwarder as in Protocol Independent Multicast ("PIM"), to forward the traffic to the L3 cloud without duplicates. It should also be understood that while embodiments of the present disclosure treat HSRP control packets differently, no changes may be made to IGMP or PIM control plane packet forwarding.

For return traffic from the L3 network to node 120, one router 140 may be the PIM designated forwarder. As such, one L3 router 140 may forward the packet into the L2 cloud 110. This packet may be tagged with the switch id of the L2MP switch on which it lands, as the source MAC will be the MAC address of the router 140 which is the designated forwarder.

Figure 4:
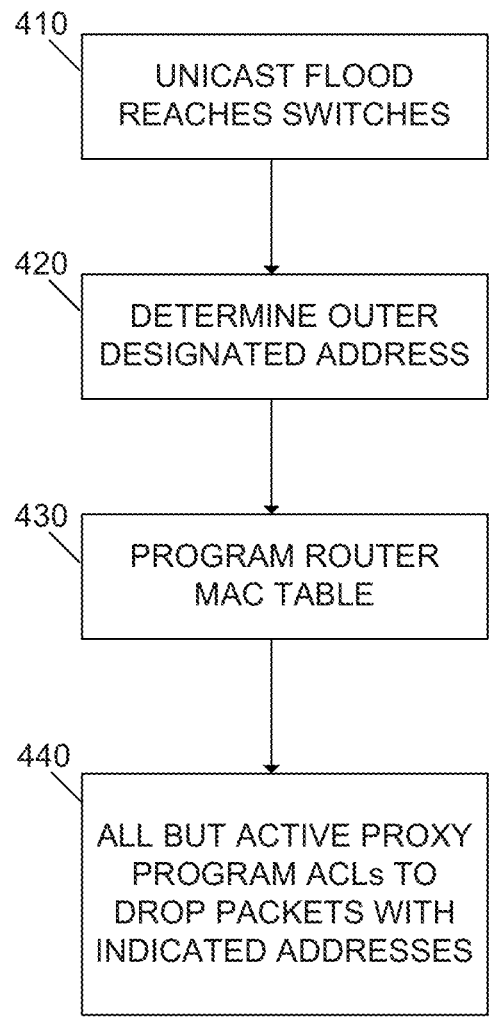
FIG. 4 illustrates a flow chart description of embodiments of the present disclosure.

FIG. 4 illustrates a flowchart describing embodiments of an unknown unicast (or broadcast) flood from node 120 to the L3 network. Such a flow may cause L3 duplicates, especially if the inner designated address is the HSRP virtual MAC and it ends up getting routed at each of the active routers 140. This flow may result if a switch has flushed its virtual MAC-to-emulated switch 250 binding, and sends an unknown unicast flood with the inner designated address.

At step 410, the unicast packet flood may reach all of switches 130a, 130b, 130c. Once the packet flood is received, the method may proceed to step 420. At step 420, it may be determined that the outer designated address is MC1. As such, the MAC table lookup step described above may be skipped.

Next, the method may proceed to step 430 where the router MAC match table may be programmed with the virtual MAC address (the inner designated address) and the if-index which it goes out of This may direct the packet out of the desired interface. This programming step may occur on one of the proxy HSRP routers 140.

Next, at step 440, all but the active proxy HSRP router 140 will program an ACL to drop packets with vMAC as the inner designated address and MC1 as the outer designated address. This may avoid flooding the packets out of router-facing interfaces. In the absence of this layer of support, transient floods may occur until the virtual MAC-to-switch identifier binding is relearnt by all switches 130*a*, 130*b*, 130*c*. The relearning may occur through HSRP hellos as discussed above.

Hosts may also send unicast ARP requests for the virtual MAC and Gateway IP addresses. In this case, only one of the switches 130*a*, 130*b*, 130*c* may receive the requests. The switch then needs to trap the unicast ARPs (based on Gateway IP/Target IP) and subsequently respond with identification information for emulated switch 250.

Figure 5:
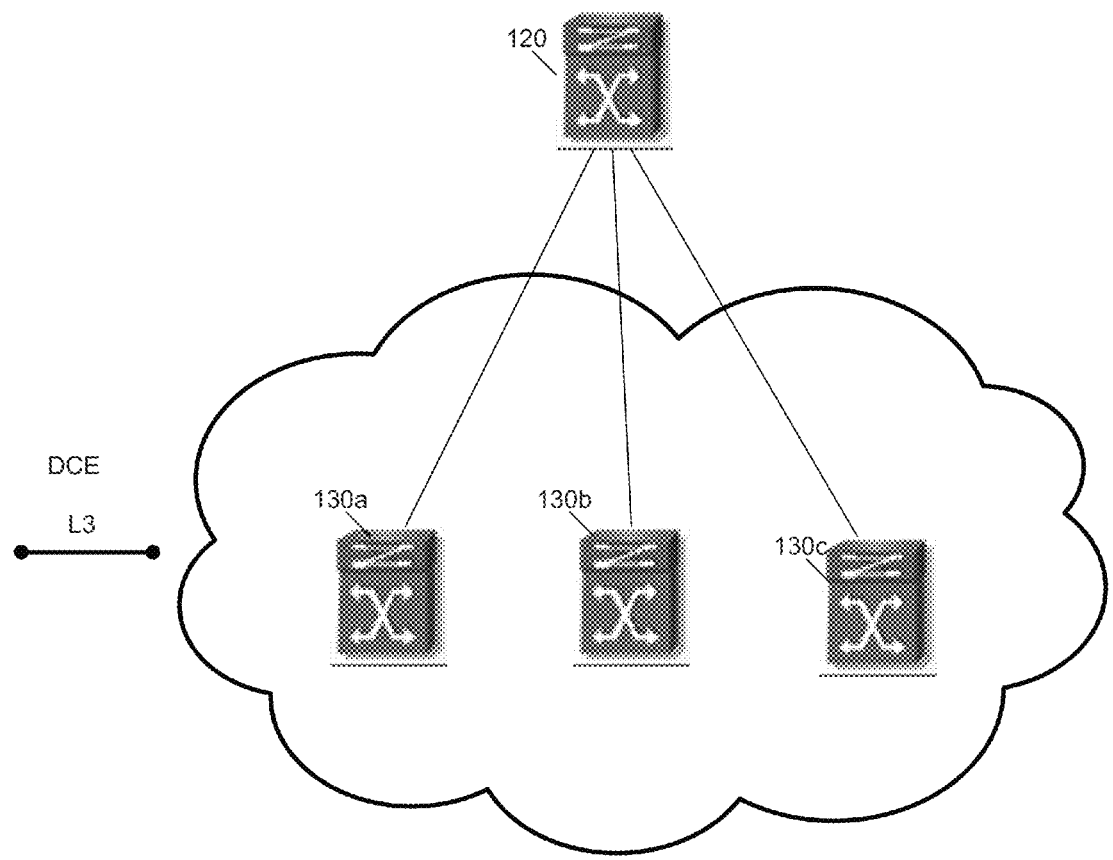
FIG. 5 illustrates an operating environment for embodiments described in the present disclosure.

FIG. 5 illustrates an operating environment for embodiments of the present disclosure. While examples above have been described in respect to the topology illustrated in FIG. 2, various topologies are appropriate for the application of embodiments of the present disclosure. For example, node 120 may be in communication with switches 130*a*, 130*b*, 130*c* as described in FIG. 2. However, here, switches 130*a*, 130*b*, 130*c* in cloud 110 are on a co-located DCE/L3 boundary 510.

Figure 6:
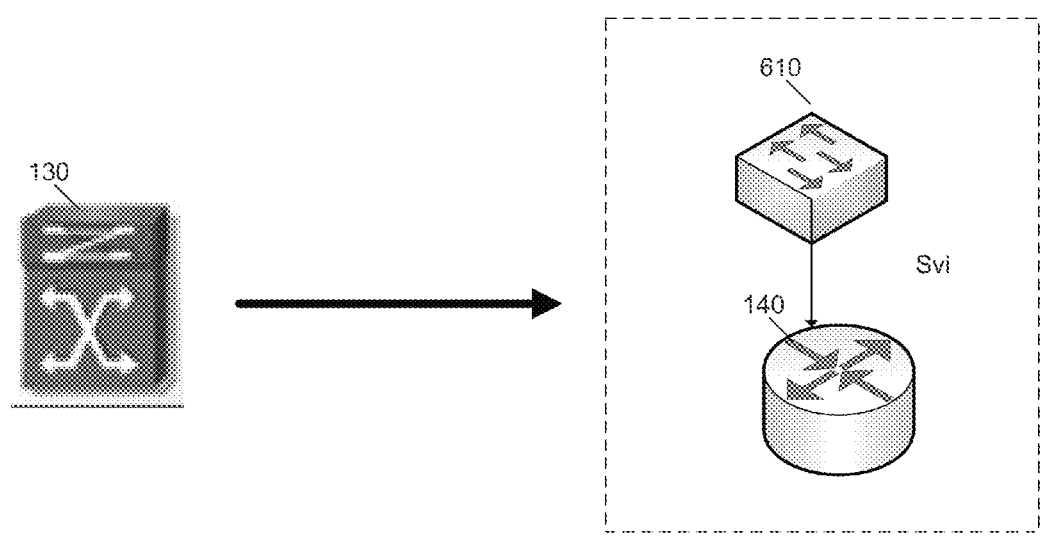
FIG. 6 illustrates an embodiment of a co-located DCE/L3 boundary.

FIG. 6 illustrates an embodiment of the co-located DCE/L3 boundary 510. Internal Switched Virtual Interface (SVI) port 610 may be a router-facing port. As such, packet filtering (and other network device operated steps) may be performed on internal SVI port 610. One of the routers (i.e., router 140) in the complex may need to respond to broadcast ARP requests. Alternatively, unicast ARP requests need to be responded to by the router on which it lands. Also, one router may need to forward an unknown unicasts flood with the internal designated address set as the virtual MAC address into the L3 cloud.

Figure 7:
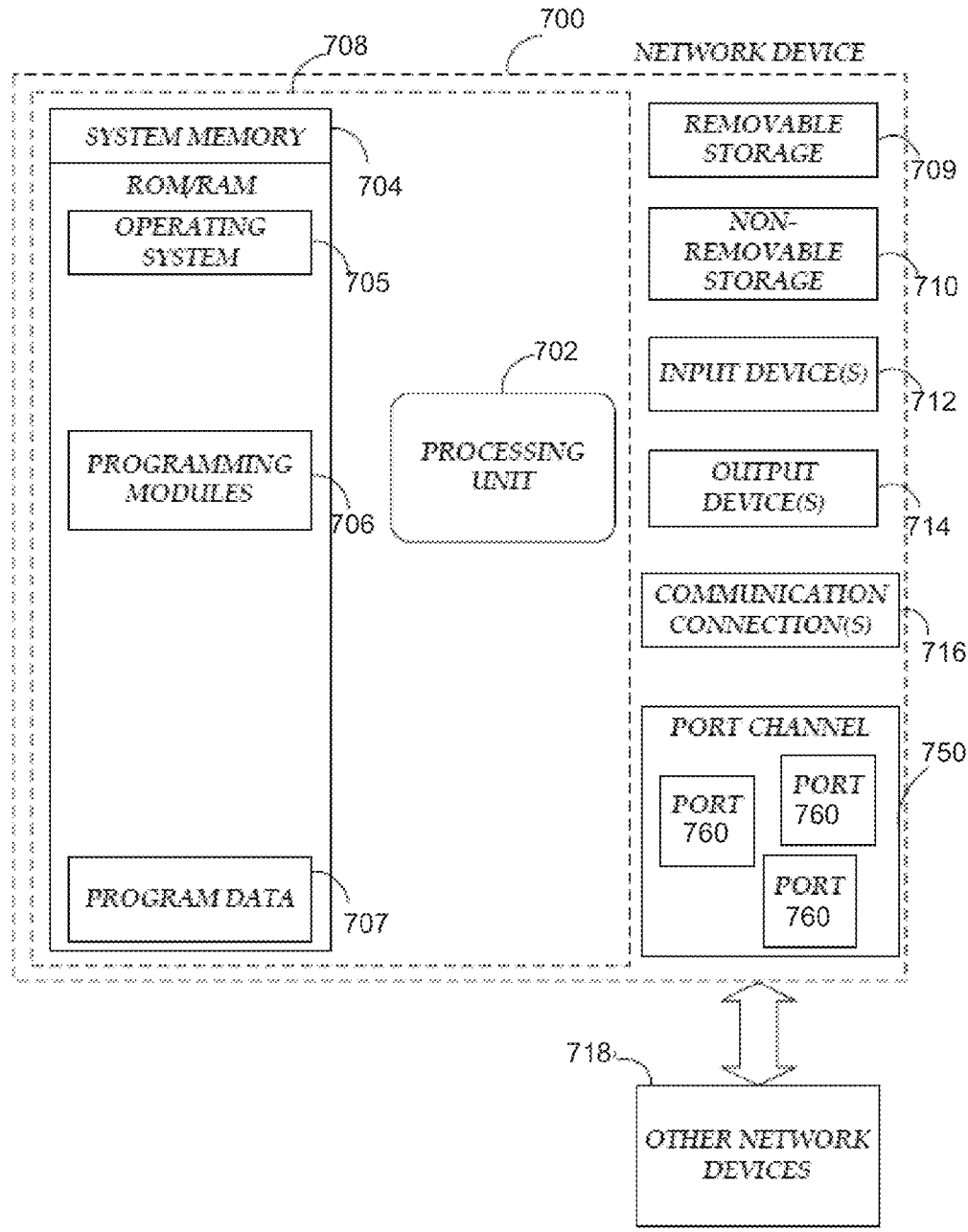
FIG. 7 illustrates an operating environment for embodiments described in the present disclosure.

FIG. 7 is a block diagram of a system including network device 700. Embodiments of Proxy FHRP for anycast routing services may be implemented in a network device, such as network device 700 of FIG. 7. In embodiments, network device 700 may be a network switch, network router, or other suitable network device. Any suitable combination of hardware, software, or firmware may be used to implement embodiments of Proxy FHRP for anycast routing. For example, embodiments of Proxy FHRP for anycast routing may be implemented with network device 700 or any of other network devices 718. The aforementioned system, device, and processors are examples and other systems, devices, and processors may comprise the aforementioned memory storage and processing unit, consistent with embodiments of Proxy FHRP for anycast routing. Furthermore, network device 700 may comprise an operating environment as described above.

With reference to FIG. 7, a system consistent with embodiments of Proxy FHRP for anycast routing may include a network device, such as network device 700. In a basic configuration, network device 700 may include at least one processing unit 702 and a system memory 704. Depending on the configuration and type of network device, system memory 704 may comprise, but is not limited to, volatile (e.g., random access memory (RAM)), non-volatile (e.g., read-only memory (ROM)), flash memory, or any combination. System memory 704 may include operating system 705, one or more programming modules 706, and may include program data 707. Operating system 705, for example, may be suitable for controlling network device 700's operation. Furthermore, embodiments of Proxy FHRP for anycast routing may be practiced in conjunction with a graphics library, other operating systems, or any other application program and is not limited to any particular application or system. This basic configuration is illustrated in FIG. 7 by those components within a dashed line 708.

Network device 700 may have additional features or functionality. For example, network device 700 may also include additional data storage devices (removable and/or non-removable) such as, for example, magnetic disks, optical disks, or tape. Such additional storage is illustrated in FIG. 7 by a removable storage 709 and a non-removable storage 710. Computer storage media may include volatile and nonvolatile, removable and non-removable media implemented in any method or technology for storage of information, such as computer readable instructions, data structures, program modules, or other data. System memory 704, removable storage 709, and non-removable storage 710 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by network device 700. Any such computer storage media may be part of device 700. Network device 700 may also have input device(s) 712 such as a keyboard, a mouse, a pen, a sound input device, a touch input device, etc. Output device(s) 714 such as a display, speakers, a printer, etc. may also be included. The aforementioned devices are examples and others may be used.

Network device 700 may also contain a communication connection 716 that may allow network device 700 to communicate with other network devices 718, such as over a network in a distributed network environment, for example, an intranet or the Internet. Communication connection 716 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 704, including operating system 705. While executing on processing unit 702, programming modules 706 may perform processes including, for example, one or more of method 300 or 400's stages as described above.

Embodiments of the present disclosure, for example, are described above with reference to block diagrams and/or operational illustrations of methods, systems, and computer program products according to embodiments of this disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

All rights including copyrights in the code included herein are vested in and are the property of the Applicant. The Applicant retains and reserves all rights in the code included herein, and grants permission to reproduce the material only in connection with reproduction of the granted patent and for no other purpose.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as examples for embodiments of the disclosure.

At least the following is claimed:

1. A method comprising:
    emulating a switch connected to a cloud network, wherein the emulated switch is accessible by a plurality of cloud network junction devices;
    filtering Hot Standby Router Protocol ("HSRP") hello messages at the plurality of cloud network junction devices;
    electing a primary HSRP proxy from the plurality of cloud network junction devices; and
    directing traffic from a first network device through the primary HSRP proxy to the emulated switch.

2. The method of claim 1, wherein the cloud network junction devices are edge switches between a Data-Center Ethernet ("DCE") cloud and a Layer 3 ("L3") network.

3. The method of claim 2, further comprising: routing the traffic through one or more Equal Cost Multi-Path ("ECMP") devices between the first network device and the emulated switch.

4. The method of claim 2, further comprising: operating one or more routers in the L3 network as HSRP active.

5. The method of claim 2, wherein the step of filtering further comprises:
    intercepting HSRP control packets to prevent forwarding of the packets to the DCE cloud; and
    punting the HSRP control packets to a supervisor device.

6. The method of claim 5, further comprising:
    programming a media access control ("MAC") table with the HSRP virtual MAC pointing to the router-facing interfaces.

7. The method of claim 5, further comprising: searching for active routers; after finding no active routers, declaring the network device performing the searching as active and ready to forward L3 traffic.

8. A network device comprising:
    a memory; and
    a processor capable of executing instructions stored in the memory, the instructions comprising:
    emulating a switch connected to a cloud network, wherein the emulated switch is accessible by a plurality of cloud network junction devices;
    filtering Hot Standby Router Protocol ("HSRP") hello messages at the plurality of cloud network junction devices;
    electing a primary HSRP proxy from the plurality of cloud network junction devices; and
    directing traffic from a first network device through the primary HSRP proxy to the emulated switch.

9. The network device of claim 8, wherein the cloud network junction devices are edge switches between a Data-Center Ethernet ("DCE") cloud and a Layer 3 ("L3") network.

10. The network device of claim 9, wherein the instructions further comprise: routing the traffic through one or more Equal Cost Multi-Path ("ECMP") devices between the first network device and the emulated switch.

11. The network device of claim 9, wherein the instructions further comprise: operating one or more routers in the L3 network as HSRP active.

12. The network device of claim 9, wherein the instructions further comprise: intercepting HSRP control packets to prevent forwarding of the packets to the DCE cloud; and punting the HSRP control packets to a supervisor device.

13. The network device of claim 12, wherein the instructions further comprise: programming a media access control ("MAC") table with the HSRP virtual MAC pointing to the router-facing interfaces.

14. The network device of claim 12, wherein the instructions further comprise: searching for active routers; after finding no active routers, declaring the network device performing the searching as active and ready to forward L3 traffic.

* * * * *